United States Patent
Ge et al.

(10) Patent No.: US 9,698,719 B2
(45) Date of Patent: Jul. 4, 2017

(54) LINEAR MOTOR DRIVER AND METHOD FOR DRIVING SAME

(71) Applicants: Huan Ge, Shenzhen (CN); Lijian Ye, Shenzhen (CN); Rongguan Zhou, Shenzhen (CN)

(72) Inventors: Huan Ge, Shenzhen (CN); Lijian Ye, Shenzhen (CN); Rongguan Zhou, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/225,356

(22) Filed: Aug. 1, 2016

(65) Prior Publication Data
US 2017/0093318 A1    Mar. 30, 2017

(30) Foreign Application Priority Data
Sep. 30, 2015 (CN) .......................... 2015 1 0641037

(51) Int. Cl.
*H02K 41/00*    (2006.01)
*H02P 25/06*    (2016.01)
*H02P 29/032*    (2016.01)
*H02P 29/64*    (2016.01)

(52) U.S. Cl.
CPC ............ *H02P 25/06* (2013.01); *H02P 29/032* (2016.02); *H02P 29/64* (2016.02)

(58) Field of Classification Search
CPC .. G06F 3/01; G06F 3/016; G08B 6/00; H02K 33/00; H02K 41/00; H02P 1/00; H02P 3/00; H02P 5/00
USPC ....... 318/634, 641, 671, 677, 678, 679, 680, 318/681, 687, 38, 78, 114, 117, 119, 135, 318/700, 783, 814, 471, 472; 335/90, 335/235, 252; 336/100; 338/16
See application file for complete search history.

(56) References Cited

U.S. PATENT DOCUMENTS

| | | | |
|---|---|---|---|
| 8,981,682 B2* | 3/2015 | Delson | A63F 13/06 318/114 |
| 2004/0169480 A1* | 9/2004 | Ueda | B26B 19/282 318/114 |

* cited by examiner

*Primary Examiner* — Antony M Paul
(74) *Attorney, Agent, or Firm* — Na Xu; IPro, PLLC

(57) ABSTRACT

The present disclosure discloses a linear vibration motor driver including an amplitude and temperature testing unit, a gain controller, and a coil resistance detector and an amplifier. The amplitude and temperature testing unit receives a motor drive input signal and a feedback drive signal output by the amplifier, and outputs a corresponding estimated motor amplitude and real-time temperature according to the motor drive input signal and the feedback drive signal. The amplifier adjusts magnification, amplifies the motor drive input signal according to the magnification and outputs the feedback drive signal to drive the motor. The present disclosure can adjust the magnitude of the drive signal according to current estimated amplitude and maximum amplitude and make corresponding rectification of the amplifier magnification upon too high temperature to extend the service life of the motor.

10 Claims, 1 Drawing Sheet

LINEAR MOTOR DRIVER AND METHOD FOR DRIVING SAME

FIELD OF THE INVENTION

The present disclosure is related to vibration motors, specifically related to a vibration motor for portable consumer electronic products, and to a method for driving the motor.

DESCRIPTION OF RELATED ART

A vibration motor is applied to feedback of system generally, for example, incoming call prompt, message prompt and navigation prompt of mobile phone, vibration feedback of game player, etc. for portable consumer electronic products, such as mobile phone, handheld game player, navigation unit or handheld multimedia entertainment equipment which is more and more popular with people along with the development of the electronic technique.

The basic operation principle of a linear vibration motor is similar to a loudspeaker in that it drives mechanical structure to vibrate by use of the Ampere force imposed upon energized coil in magnetic field. Linear motor is usually designed to have a relatively high Q value at resonance frequency with its frequency response curve attenuating quickly at the deviation from the resonance frequency, so linear motor mostly works near the resonance frequency. While the linear motor could have two and even more resonance frequencies by proper structural design on basis of the linear motor of single resonance frequency.

In case of traditional drive mode, the linear motor is subjected to two major damaging factors, including mechanical damage caused by too big vibration amplitude and overheating components damage caused by too high coil temperature, wherein the too big amplitude usually occurs at the resonance frequency, while the too high coil temperature is more attributed to the heat accumulation resulted from degrading efficiency of electrical power-mechanical power transformation caused by deviation of the drive signal from the resonance frequency.

Therefore, an improved linear vibration motor driver which can overcome the problems mentioned above is accordingly desired.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
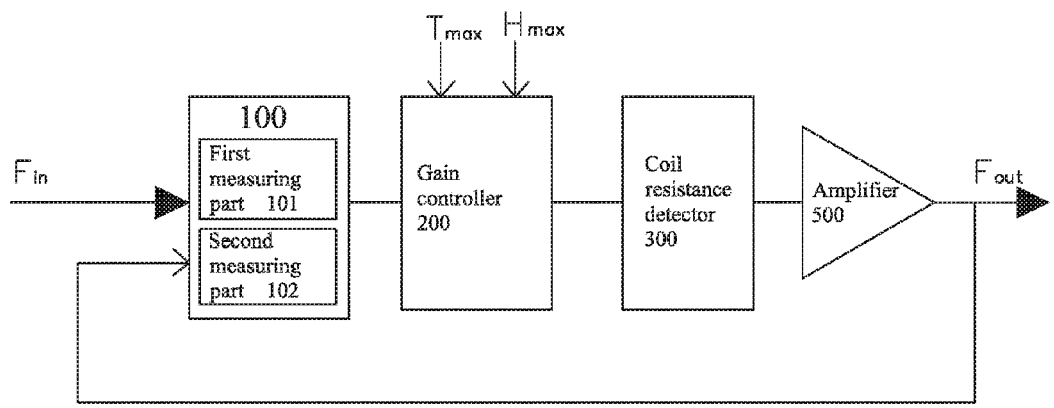
FIG. 1 is a structural diagram of a linear vibration motor driver in accordance with an exemplary embodiment of the present disclosure.

As shown in FIG. 1, the present disclosure discloses a linear vibration motor driver, comprises an amplitude and temperature testing unit 100, a gain controller 200, a coil resistance detector 300 and an amplifier 500 connected in sequence.

The amplitude and temperature testing unit 100 receives a motor drive input signal $F_{in}$ and a feedback drive signal $F_{out}$ output by the amplifier 500, and outputs the corresponding estimated motor amplitude $H(\omega)$ and real-time temperature $T_m$, according to the motor drive input signal $F_{in}$ and the feedback drive signal $F_{out}$. The amplitude and temperature testing unit 100 comprises a first measuring part 101 for testing and acquiring the estimated motor amplitude $H(\omega)$ and a second measuring part 102 for testing and acquiring the real temperature $T_m$.

In the first measuring part 101, the estimated motor amplitude $H(\omega)$ is acquired corresponding to the motor drive input signal $F_{in}$ through building up amplitude model:

The first measuring part 101 receives the feedback drive signal $F_{out}$, the feedback drive signal $F_{out}$ comprises voltage and current feedback drive signal and the AC impedance signal, the first measuring part 101 acquires the motor impedance $Z$ according to the feedback drive signal $F_{out}$, acquires mechanical impedance $Z_m$ in combination with the AC impedance signal, and acquires the estimated motor amplitude by use of the following conditional expression.

$$H(\omega) = \frac{1}{\frac{j\omega Z_e Z_m}{Bl} + j\omega Bl},$$

$$Z = Z_e + \frac{(Bl)^2}{Z_m},$$

Wherein, $H(\omega)$ is the estimated motor amplitude, $Bl$ is the power coupling coefficient, $Z$ is the motor impedance, $Z_m$ is the mechanical impedance, $Z_e$ is the coil real-time resistance value.

Specifically, taking the linear motor of single resonance frequency as an example, under linear conditions, the vibration of mechanical system driven by the Ampere force satisfies the formula:

$$F = M_m \ddot{x} + R_m \dot{x} + K_m x \tag{1}$$

Wherein, F=Bli represents the Ampere force imposed upon the coil, Bl is the power coupling coefficient, I is the coil current; $M_m$, $R_m$, and $K_m$, are the quality, damping and stiffness coefficients of vibration system.

The relation between the voltage imposed upon the motor and the coil current can be expressed as:

$$u = R_e i + L_e \frac{di}{dt} + Bl\dot{x} \tag{2}$$

Wherein, u is drive voltage, i is coil current, $R_e$, $L_e$ are coil DC resistance and inductance respectively.

The Fourier transformation forms of formula (1) and (2) are respectively:

$$BlI(\omega) = j\omega Z_m \cdot X(\omega) \tag{3}$$

$$U(\omega) = Z_e \cdot I(\omega) + j\omega Bl \cdot X(\omega) \tag{4}$$

Wherein $$Z_m = R_m + j\left(\omega M_m - \frac{K_m}{\omega}\right)$$

and $$Z_e = R_e + j\omega L_e$$

are respectively the mechanical impedance of vibration system and the coil real-time resistance value. And there exists the following relation between the mechanical impedance $Z_m$ and the coil real-time resistance value:

$$Z = Z_e + \frac{(Bl)^2}{Z_m},$$

$$Z = \frac{U(\omega)}{I(\omega)}$$

Wherein Z is the motor impedance which can be acquired through the ratio of the output voltage $U(\omega)$ in the voltage and current feedback drive signal to the output current $I(\omega)$.

Expressions (3) and (4) could result in the amplitude-input voltage transmission function of the motor, i.e. transmission function of amplitude model d:

$$H(\omega) = \frac{1}{\frac{j\omega Z_e Z_m}{Bl} + j\omega Bl} \quad (5)$$

For the mini linear motor used for mobile devices, the coil inductance usually is ignorable. During the operation, the coil DC resistance can be regarded as approximately constant, i.e. it's regarded that the change of amplitude model is mainly influenced by the change of $Z_m$. The transmission can be just used for predicting the amplitude that the motor reaches under a certain input signal, by comparison of the estimated motor amplitude $H(\omega)$ and the known motor maximum amplitude $H_{max}$, the gain controller 200 could adjust the feedback drive signal $F_{out}$ to allow the motor operates within the safety range not higher than the maximum amplitude.

In the second measuring part 102, due to the tightness of motor structure, usually the coil temperature cannot be measured directly, instead, the real-time temperature $T_m$ corresponding to the motor drive input signal is acquired by building up temperature model through the following formula:

$$c = \frac{dR}{RdT}$$

Wherein, c is the resistance temperature coefficient, dR is the change of wire resistance, dT is the corresponding change of wire temperature. The value of c is only relevant with wire material, not influenced by the geometric size of the wire. So, if the DC resistance value of the wire at some initial temperatures and the corresponding resistance temperature coefficient c of wire material are known, the real-time temperature Tm of the wire could be evaluated according to the DC resistance value of the wire at any subsequent random moment (i.e., the coil real-time resistance value $Z_e$).

The coil resistance detector 300 tests the gain control signal and acquires an AC impedance signal corresponding to the motor drive input signal, the AC impedance signal is output with the feedback drive signal $F_{out}$ through the amplifier 500. The coil resistance detector 300 functions to measure the motor AC resistance at the same frequency point as the voltage and current feedback drive signal in combination with that signal, to approximate the real-time coil DC resistance value. Thereby the detection signal shall satisfy the requirements for such features as low frequency, small magnitude and being far away from resonance frequency, to make approximate measurement of the coil DC resistance without influence on normal vibration of the motor as possible as it can. Meanwhile, the voltage and current feedback drive signal could acquire the motor impedance value at the same frequency point as the drive signal, and in combination with the measurement result of the coil DC resistance, obtain the real-time amplitude model and temperature model to be used for calculation of the estimated amplitude and real-time temperature of the motor.

Figure 2:
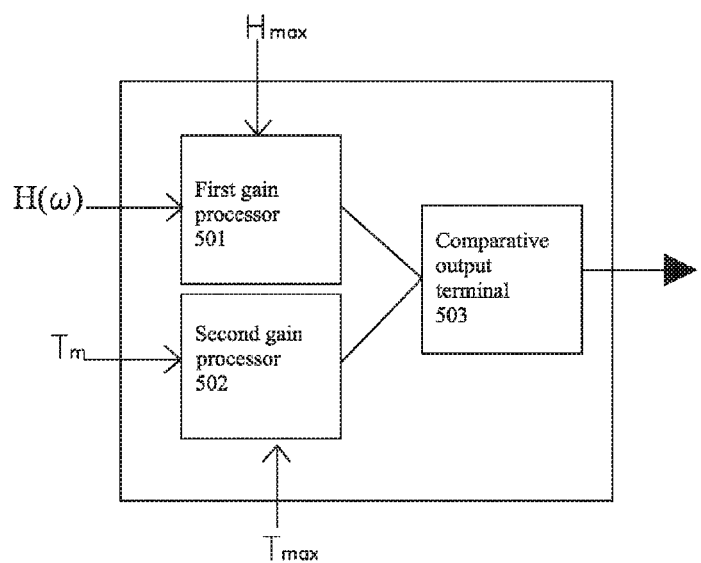
FIG. 2 is a structural diagram of a gain controller of the linear vibration motor driver in FIG. 1.

The gain controller 200 receives the estimated motor amplitude signal $H(\omega)$ and the real-time temperature Tm, and outputs a gain control signal to the amplifier 500 according to the ratio of the estimated amplitude $H(\omega)$ to the maximum amplitude $H_{max}$ of the motor and the ratio of the real-time temperature $T_m$ and the maximum temperature $T_{max}$ of the motor respectively. Specifically, as shown in FIG. 2, the gain controller 500 comprises the first gain processor 501, the second gain processor 502 and the comparative output terminal 503 connected with the first gain processor 501 and the second gain processor 502 respectively.

The first gain processor 501 outputs the first gain according to the estimated motor amplitude $H(\omega)$ and the maximum amplitude $H_{max}$;

The second gain processor 502 outputs the second gain according to the real-time temperature Tm and the maximum temperature $T_{max}$;

The comparative output terminal 503 makes comparison between the first gain and second gain to output the gain control signal.

By comparison of the two gains to output gain control signal, finally the amplifier 500 adjusts magnification according to the gain control signal, amplifies the motor drive input signal Fin according to the magnification and outputs the feedback drive signal $F_{out}$ to drive the motor, so as to make sure the feedback drive signal $F_{out}$ output through the amplifier could drive the motor effectively and ensure neither mechanical damage to the motor caused by too big amplitude nor overheating damage of components under the temperature influence. Alternatively, under specific situation, the user could select any one of the two gains to adjust the magnification of the amplifier 500, specifically be subject to the actual situation.

In another preferred embodiment of the present utility model, the real-time temperature $T_m$ could also be acquired through real-time monitoring by the temperature sensor integrated on the mainboard, which records mainboard temperature and the motor coil DC resistance simultaneously with the energization of system each time, it's regarded that the temperature of the mainboard is the same as that of the motor coil at this moment.

The present disclosure further discloses a linear motor drive method using the linear vibration motor driver which has all the technique features of the drive device as mentioned above and shown in FIG. 1-2. Specifically, the linear motor drive method comprises:

Amplitude and temperature testing step: the amplitude and temperature testing unit 100 receives the motor drive input signal $F_{in}$ and the feedback drive signal $F_{out}$ output by the amplifier 500, and outputs the corresponding estimated motor amplitude $H(\omega)$ and real-time temperature $T_m$ according to the motor drive input signal $F_{in}$ and the feedback drive signal $F_{out}$.

Gain control step: the gain controller 200 receives the estimated motor amplitude signal $H(\omega)$ and real-time temperature $T_m$, and outputs a gain control signal according to the ratio of the estimated amplitude $H(\omega)$ to the maximum amplitude $H_{max}$ of the motor and the ratio of the real-time temperature Tm and the maximum temperature $T_{max}$ of the motor respectively. The gain control step comprises: the first gain processor 501 outputs the first gain according to the estimated motor amplitude and the maximum amplitude; the second gain processor 502 outputs the second gain according to the real-time temperature and the maximum temperature; the comparative output terminal 503 compares the first gain and second gain to output the gain control signal.

Coil resistance detection step: the coil resistance detector 300 tests the gain control signal and acquires an AC impedance signal corresponding to the motor drive input signal, the AC impedance signal is output through the feedback drive signal $F_{out}$.

Feedback output step: the amplifier 500 adjusts magnification according to the gain control signal, amplifies the motor drive input signal $F_{in}$ according to the magnification and outputs the feedback drive signal $F_{out}$ to drive the motor.

In the amplitude and temperature testing step, the feedback drive signal $F_{out}$ comprises voltage and current feedback drive signal and the AC impedance signal, the first measuring part 100 acquires the estimated motor amplitude $H(\omega)$ according to the following formula:

$$H(\omega) = \frac{1}{\frac{j\omega Z_e Z_m}{Bl} + j\omega Bl},$$

$$Z = Z_e + \frac{(Bl)^2}{Z_m}$$

Wherein, $H(\omega)$ is the estimated motor amplitude;
Bl is the power coupling coefficient;
Z is the motor impedance which is acquired according to the voltage and current feedback drive signal;
$Z_m$ is the mechanical impedance;
$Z_e$ is the coil real-time resistance value which is acquired by combination of the voltage and current feedback drive signal and the AC impedance signal.

In the amplitude and temperature testing step, the second measuring part 102 acquires the real-time temperature Tm corresponding to the real-time resistance value $Z_e$ according to the coil initial temperature $T_0$, initial coil resistance value $R_0$ corresponding to the initial temperature $T_0$ and the real-time resistance value $Z_e$. In other optional embodiments, the real-time temperature $T_m$ could also be acquired through real-time monitoring by the temperature sensor.

The linear vibration motor driver and the linear motor drive method of the present disclosure are used for adjusting the magnitude of the output drive signal according to the current estimated amplitude and maximum amplitude and making corresponding rectification of the amplifier magnification at too high temperature so as to prevent mechanical damage caused by too big vibration amplitude and overheating components damage caused by too high coil temperature to the linear motor, thus improving the motor performance significantly and extend the service life of motor.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A linear vibration motor driver, comprising:
   an amplitude and temperature testing unit,
   a gain controller,
   a coil resistance detector, and
   an amplifier connected in sequence; wherein
   the amplitude and temperature testing unit receives a motor drive input signal and a feedback drive signal output by the amplifier, and outputs a corresponding estimated motor amplitude and real-time temperature according to the motor drive input signal and the feedback drive signal;
   the gain controller receives the estimated motor amplitude and the real-time temperature, and outputs a gain control signal to the amplifier according to the ratio of the estimated amplitude to the maximum amplitude of the motor and the ratio of the real-time temperature and the maximum temperature of the motor respectively;
   the coil resistance detector tests the gain control signal and acquires an AC impedance signal corresponding to the motor drive input signal, and the AC impedance signal is output through the amplifier; and
   the amplifier adjusts magnification according to the gain control signal, amplifies the motor drive input signal according to the magnification and outputs the feedback drive signal to drive the motor.

2. The linear vibration motor driver as described in claim 1, wherein the amplitude and temperature testing unit comprises a first measuring part for receiving the feedback drive signal, the feedback drive signal comprises voltage and current feedback drive signal and the AC impedance signal, the first measuring part acquires motor impedance Z according to the feedback drive signal, acquires mechanical impedance $Z_m$ in combination with the AC impedance signal, and acquires the estimated motor amplitude by employing the following conditional expression:

$$H(\omega) = \frac{1}{\frac{j\omega Z_e Z_m}{Bl} + j\omega Bl},$$

$$Z = Z_e + \frac{(Bl)^2}{Z_m},$$

wherein, $H(\omega)$ is the estimated motor amplitude, Bl is the power coupling coefficient, Z is the motor impedance, $Z_m$ is the mechanical impedance, $Z_e$ is the coil real-time resistance value.

3. The linear vibration motor driver as described in claim 2, wherein the amplitude and temperature testing unit comprises a second measuring part for acquiring the real-time temperature corresponding to the real-time resistance value based on the coil initial temperature, initial coil resistance value corresponding to the initial temperature and the real-time resistance value.

4. The linear vibration motor driver as described in claim 2, wherein the amplitude and temperature testing unit comprises a temperature sensor for real-time monitoring the real-time temperature.

5. The linear vibration motor driver as described in claim 3, wherein the gain controller comprises a first gain processor, a second gain processor and a comparative output terminal connected with the first gain processor and the second gain processor respectively; the first gain processor outputs the first gain according to the estimated motor amplitude and the maximum amplitude; the second gain processor outputs the second gain according to the real-time temperature and the maximum temperature; the comparative output terminal makes comparison between the first gain and second gain to output the gain control signal.

6. A linear motor drive method using the linear vibration motor driver described in claim 1, comprising the steps of:
   amplitude and temperature testing step: outputting corresponding estimated motor amplitude and real-time temperature according to the motor drive output signal and the feedback drive signal;
   gain control step: outputting the gain control signal according to the ratio of the estimated amplitude to the maximum amplitude of the motor and the ratio of the real-time temperature to the maximum temperature of the motor respectively;
   coil resistance detection step: testing the gain control signal and acquiring an AC impedance signal corresponding to the motor drive input signal, wherein the AC impedance signal is output through the feedback drive signal;
   feedback output step: adjusting magnification according to the gain control signal, amplifying the motor drive input signal according to the magnification and outputting the feedback drive signal to drive the motor.

7. The linear motor drive method as described in claim 6, wherein in the amplitude and temperature testing step, the feedback drive signal comprises a voltage and current feedback drive signal and the AC impedance signal, the estimated motor amplitude is acquired according to the following formula:

$$H(\omega) = \frac{1}{\frac{j\omega Z_e Z_m}{Bl} + j\omega Bl},$$

$$Z = Z_e + \frac{(Bl)^2}{Z_m},$$

Wherein, $H(\omega)$ is the estimated motor amplitude;
$Bl$ is the power coupling coefficient;
$Z$ is the motor impedance which is acquired according to the voltage and current feedback drive signal;
$Z_m$ is the mechanical impedance;
$Z_e$ is the coil real-time resistance value which is acquired by combination of the voltage and current feedback drive signal and the AC impedance signal.

8. The linear motor drive method as described in claim 7, wherein in the amplitude and temperature testing step, the real-time temperature is acquired corresponding to the real-time resistance value based on the coil initial temperature, initial coil resistance value corresponding to the initial temperature and the real-time resistance value.

9. The linear motor drive method as described in claim 6, wherein in the amplitude and temperature testing step, the real-time temperature is acquired through real-time monitoring performed by the temperature sensor.

10. The linear motor drive method as described in claim 6, wherein the gain control step comprises the steps of:
   outputting a first gain according to the estimated motor amplitude and the maximum amplitude;
   outputting a second gain according to the real-time temperature and the maximum temperature;
   comparing the first gain and second gain for outputting the gain control signal.

* * * * *